United States Patent
Sambhwani et al.

(10) Patent No.: US 9,232,509 B2
(45) Date of Patent: Jan. 5, 2016

(54) APPARATUS AND METHODS FOR IMPROVING DEMODULATION RELIABILITY OF AN UPLINK HIGH SPEED-DEDICATED PHYSICAL CONTROL CHANNEL

(71) Applicant: QUALCOMM Incorporated, San Diego, CA (US)

(72) Inventors: Sharad Deepak Sambhwani, San Diego, CA (US); Haitong Sun, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 13/970,425

(22) Filed: Aug. 19, 2013

(65) Prior Publication Data

US 2014/0056242 A1  Feb. 27, 2014

Related U.S. Application Data

(60) Provisional application No. 61/691,490, filed on Aug. 21, 2012.

(51) Int. Cl.
| | | |
|---|---|---|
| *H04L 1/00* | (2006.01) | |
| *H04W 72/04* | (2009.01) | |
| *H04L 1/16* | (2006.01) | |
| *H04W 52/40* | (2009.01) | |
| *H04W 52/32* | (2009.01) | |

(52) U.S. Cl.
CPC ......... *H04W 72/0413* (2013.01); *H04L 1/0026* (2013.01); *H04L 1/1671* (2013.01); *H04W 52/40* (2013.01); *H04W 52/325* (2013.01)

(58) Field of Classification Search
CPC ..... H04W 72/04; H04W 72/05; H04W 72/06; H04W 84/12; H04W 84/13; H04W 84/14; H04W 84/15; H04W 84/08; H04W 84/09; H04W 84/10
USPC .................. 370/329, 335, 342, 491, 442, 537
See application file for complete search history.

(56) References Cited

U.S. PATENT DOCUMENTS

| | | | |
|---|---|---|---|
| 2003/0050084 A1 | 3/2003 | Damnjanovic et al. | |
| 2004/0058687 A1* | 3/2004 | Kim et al. | 455/452.2 |

(Continued)

FOREIGN PATENT DOCUMENTS

| | | |
|---|---|---|
| WO | WO-2012064778 | 5/2012 |
| WO | WO-2012087222 A2 | 6/2012 |

OTHER PUBLICATIONS

Ericsson et al., "Power scaling for CLTD", 3GPP Draft; R1-111751 Power Scaling for CLTD, 3rd Generation Partnership Project (3GPP), Mobile Competence Centre ; 650, Route Des Lucioles ; F-06921 Sophia-Antipolis Cedex ; France, vol. RAN WG1, no. Barcelona, Spain; May 9, 2011, May 3, 2011, XP050491345, pp. 3.

(Continued)

*Primary Examiner* — Dady Chery
(74) *Attorney, Agent, or Firm* — Darren M. Simon

(57) ABSTRACT

The present disclosure presents a method and apparatus for improving demodulation reliability of an uplink (UL) high speed dedicated physical control channel (HS-DPCCH) at a base station. For example, the disclosure presents a method for receiving a secondary pilot channel from a user equipment (UE) on an uplink (UL) and demodulating the HS-DPCCH using at least the secondary pilot channel. As such, improved demodulation reliability of an uplink (UL) high speed dedicated physical control channel (HS-DPCCH) at a base station may be achieved.

22 Claims, 8 Drawing Sheets

(56) References Cited

U.S. PATENT DOCUMENTS

2010/0061322 A1* 3/2010 Kim et al. .................. 370/329
2011/0044187 A1* 2/2011 Moulsley et al. ............ 370/252
2012/0082192 A1* 4/2012 Pelletier et al. ............. 375/219

OTHER PUBLICATIONS

Ghosh A., et al., "Control channel design for high speed downlink shared channel for 3GPPW-CDMA, Rel-5", VTC 2003—Spring. The 57th. IEEE Semiannual Vehicular Technology Conference. Proceedings. Jeju, Korea, Apr. 2003; [IEEE Vehicular Technolgy Conference], New York, NY : IEEE, US, vol. 3, Apr. 22, 2003, pp. 2085-2089, XP010862504, DOI: 10.1109/VETECS.2003.1207193, ISBN: 978-0-7803-7757-8.
International Search Report and Written Opinion—PCT/US2013/055889—ISA/EPO—Feb. 19, 2014.

* cited by examiner

APPARATUS AND METHODS FOR IMPROVING DEMODULATION RELIABILITY OF AN UPLINK HIGH SPEED-DEDICATED PHYSICAL CONTROL CHANNEL

CLAIM OF PRIORITY UNDER 35 U.S.C. §119

The present application for patent claims priority to U.S. Provisional Patent Application No. 61/691,490, filed Aug. 21, 2012, entitled "Secondary Phase Reference For Reliable Demodulation of HS-DPCCH in Severe Imbalance Conditions," which is assigned to the assignee hereof, and hereby expressly incorporated by reference herein.

BACKGROUND

1. Field

The present disclosure relates generally to communication systems, and more particularly, to an apparatus and method for improving demodulation reliability of an uplink high-speed dedicated physical control channel (HS-DPCCH).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In heterogeneous networks, for example, HSPA networks, a severe imbalance may exist in downlink and uplink path loss between a user equipment (UE) and cells belonging to an active set of the UE. The imbalance may be caused by differences in transmit powers of a macro cell and a small cell which may be in the UE's active set.

As serving cell selection in HSPA is based on downlink (DL) radio conditions, the DL and UL boundaries could be different. In other words, the point at which DL Ecp/Io from the serving cell and a non-serving cell match may be different from the point at which the UL effective path loss match for the serving cell and the non-serving cell. Additionally, at the points where the DL path loss from the serving cell is better than the non-serving cell, the non-serving cell could have a much better uplink path loss. Thus, due to existing power control procedures in CDMA, the transmit power of the UE may be power controlled down to a point where the uplink (UL) high speed dedicated physical control channel (HS-DPCCH) may not be reliably demodulated by the serving cell.

As the UE transmit power is effectively power controlled by a non-serving cell, the uplink SINR experienced at the serving cell may fluctuate a lot, and hence even if the HS-DPCCH power were to be boosted, it may not be reliably demodulated at the serving cell.

Thus, there is a desire for a method and apparatus for improving demodulation reliability of an uplink (UL) HS-DPCCH at a base station.

SUMMARY

Various aspects are now described with reference to the drawings. In the following description, for purposes of explanation, numerous specific details are set forth in order to provide a thorough understanding of one or more aspects. It may be evident, however, that such aspect(s) may be practiced without these specific details. The following presents a simplified summary of one or more aspects in order to provide a basis understanding of such aspects.

The present disclosure presents an example method and apparatus for improving demodulation reliability of an uplink (UL) high speed dedicated physical control channel (HS-DPCCH) at a base station. For example, the present disclosure presents an example method for improving demodulation reliability of an uplink (UL) high speed dedicated physical control channel (HS-DPCCH) at a base station that includes receiving a secondary pilot channel from a user equipment (UE) on an uplink (UL) and demodulating the HS-DPCCH using at least the secondary pilot channel.

In an additional aspect, the present disclosure presents an example apparatus for improving demodulation reliability of an uplink (UL) high speed dedicated physical control channel (HS-DPCCH) at a base station that includes means for receiving a secondary pilot channel from a user equipment (UE) on an uplink (UL), and means for demodulating the HS-DPCCH using at least the secondary pilot channel.

Moreover, the present disclosure presents an example computer program product for improving demodulation reliability of an uplink (UL) high speed dedicated physical control channel (HS-DPCCH) at a base station comprising a computer-readable medium comprising code executable by a computer for receiving a secondary pilot channel from a user equipment (UE) on an uplink (UL), and for demodulating the HS-DPCCH using at least the secondary pilot channel.

In a further aspect, the present disclosure presents an example apparatus for improving demodulation reliability of an uplink (UL) high speed dedicated physical control channel (HS-DPCCH) at a base station that includes a secondary pilot channel receiving component to receive a secondary pilot channel from a user equipment (UE) on an uplink (UL), and a HS-DPCCH demodulating component to demodulate the HS-DPCCH using at least the secondary pilot channel.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides apparatus and methods for improving demodulation reliability of an uplink (UL) high speed dedicated physical control channel (HS-DPCCH) at a base station by receiving a secondary pilot channel from a user equipment (UE) on an uplink (UL) and demodulating the HS-DPCCH using at least the secondary pilot channel.

Figure 1:
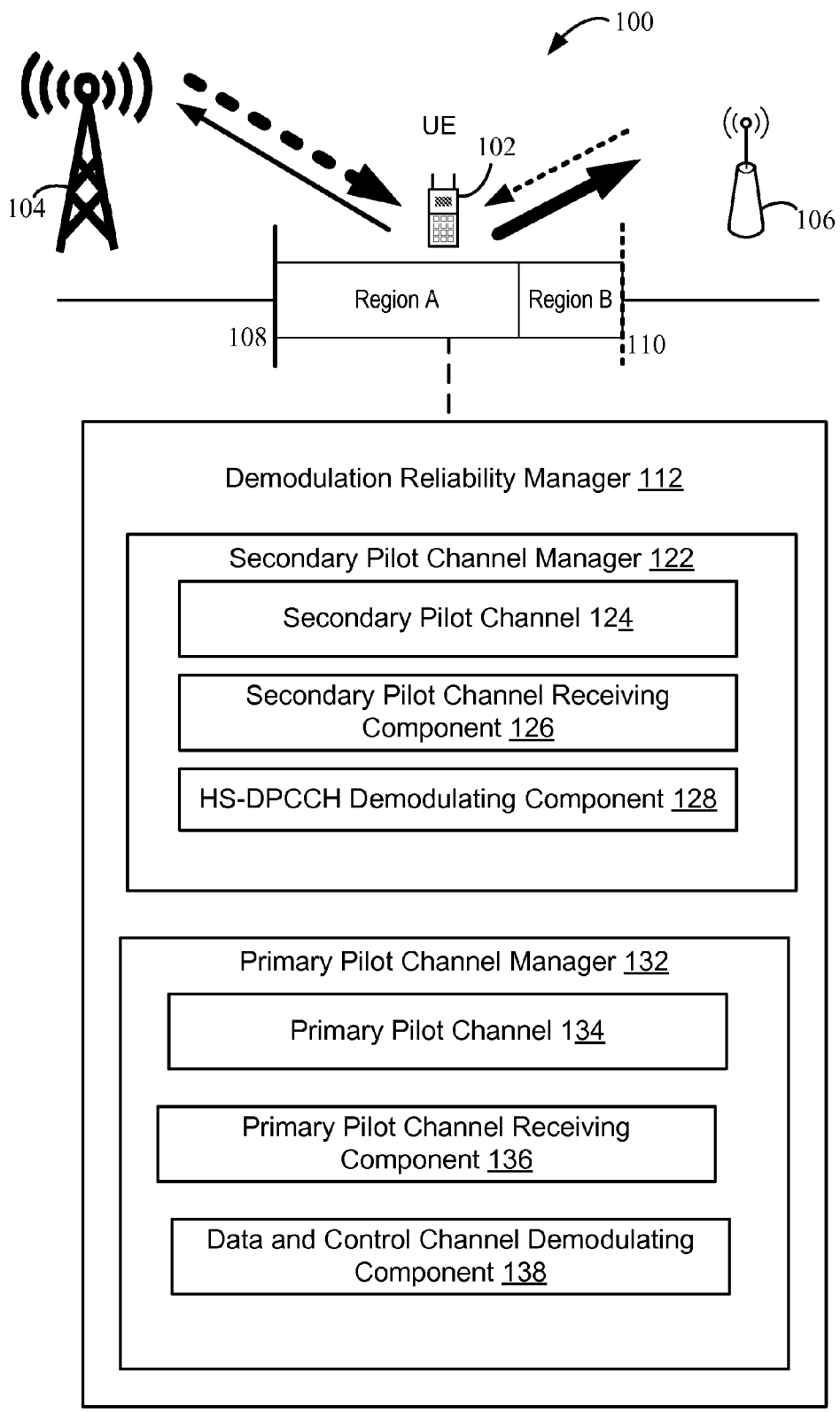
FIG. 1 is schematic diagram of a network architecture including an aspect of a demodulation reliability manager.

Referring to FIG. 1, a wireless communication system 100 is illustrated for improving demodulation reliability of an uplink (UL) high speed dedicated physical control channel (HS-DPCCH) at a base station.

In an aspect, for example, system 100 may include a demodulation reliability manager 112 that may be configured to include a secondary pilot channel manager 122 and a primary pilot channel manager 132 to improve demodulation reliability of an uplink (UL) high speed dedicated physical control channel (HS-DPCCH) at a base station 104.

For example, as explained above, severe imbalance in downlink and uplink path loss may exist between UE 102 and cells belonging to an active set of the UE, for example, a macro cell 104 and a small cell or small coverage cell 106. The imbalance may be caused by differences in transmit powers of the macro cell and the small cell. For example, a typical transmit power of a macro cell may be around 20 W and a typical transmit power of a small cell may be around 1 W. The term "small cell" or "small coverage" cell refers to, for example, a femtocell or a pico cell having a coverage area substantially less than a coverage area of a macro cell. Also, it should be noted that demodulation reliability manager 112, may be a part of one or more macro cells 104, or may be located in a separate network entity in communication with one or more of the macro cells.

In an aspect, for example, macro cell 104 may be the serving cell of UE 102. That is, UE 102 may be camped on macro cell 104. In an aspect, when UE 102 is in coverage area, Region A, the UE may be served by macro cell 104 and small cell 106 may not be in the active set of the UE. In such a scenario, the UE in Region A may can cause excessive uplink (UL) interference to the small cell. In an additional or optional aspect, when the UE is in coverage area, Region B, the UE may be served by macro cell 104 and small cell 106 may be in the active set of the UE. Since the small cell is in the active set of the UE, the UE when located in coverage area, Region B, may have unreliable HS-DPCCH as described above.

In an aspect, demodulation reliability manager 112 may include a secondary pilot channel manager 122 and a primary pilot channel manager 132. In an aspect, for example, secondary pilot channel manager 122 may include secondary pilot channel 124, a secondary pilot channel receiving component 126 and/or a HS-DPCCH demodulating component 128 for improving demodulation reliability of an uplink (UL) high speed dedicated physical control channel (HS-DPCCH) at a base station. For example, secondary pilot channel receiving component 126 may be configured to receive secondary pilot channel 124 from UE 102 on the uplink from UE 102. The secondary pilot channel 124 transmitted on the UL from the UE may be configured to serve as a phase reference for demodulation of the HS-DPCCH.

Generally, the Uplink High Speed-Dedicated Physical Control Channel (HS-DPCCH) carries acknowledgment information and/or current channel quality indicator (CQI) of a user which may be used by a base station to calculate data to send to the user on a next transmission. The use of the secondary pilot channel improves demodulation reliability of the UL HS-DPCCH as the secondary pilot channel is primarily power controlled by the serving cell, for example, macro cell 104, but not by other non-serving cells on the active list of the UE, for example, small cell 106.

In an additional or optional aspect, the secondary pilot channel 124 may be transmitted from the UE in response to transmission of HS-DPCCH from the base station, for example, macro cell 104. This may avoid a scenario in which a UE is unnecessarily transmitting a secondary pilot channel to a serving base station when the UE does not receive HS-DPCCH from the base station.

In an aspect, HS-DPCCH demodulating component 128 may be configured to demodulate the HS-DPCCH using the secondary pilot channel. For example, in an aspect, the HS-DPCCH is demodulated using the secondary pilot channel 124 as phase reference. As the secondary pilot channel is power controlled by a serving base station, for example, macro cell 104, but not by the non-serving cells in the active list of the UE, for example, small cell 106, the HS-DPCCH may be reliably demodulated at macro cell 104 using the secondary pilot channel as a phase reference. The HS-DPCCH may be reliably demodulated as the non-serving cells in an active list of the UE, for example, small cell 106 in coverage are B, may not be able to power control the secondary pilot channel 124. In an aspect, for example, the demodulation of HS-DPCCH may include demodulation of an acknowledgement message (ACK), a not acknowledged message (NACK), or a channel quality indicator (CQI) message received from the UE for scheduling downlink (DL) to the UE. In an aspect, the secondary pilot channel 124 may be a secondary dedicated physical control channel (S-DPCCH).

In an additional aspect, the secondary pilot channel may be received and power controlled by multiple serving cells if the UE is configured in a multi-flow operation. A multi-flow operation may be defined as a configuration where a UE may be configured with multiple serving cells on the downlink. In such an aspect, when the secondary pilot channel is received by multiple serving cells, the power control procedure is based on OR of UP logic where a UE, for example, UE 102, increases the transmit power of the UE if at least one of the serving cells of the multiple serving cells in a multi-flow operation transmits an "UP" transmit power command to the UE, that is, a command to increase the transmit power of the UE.

In an aspect, for optimizing the uplink overhead, the transmission of the secondary pilot channel may be gated either based on a periodic gating pattern or transmitted whenever the HS-DPCCH is transmitted. In an additional aspect, the secondary pilot channel may be received at the serving cell, for example, macro cell 104, in a discontinuous (DRX) mode. The transmission of the secondary pilot channel in a DRX mode may conserve the battery of the UE.

In an aspect, primary pilot channel manager 132 may include a primary pilot channel 134, a primary pilot channel receiving component 136, and/or a data and control channel demodulating component 138. For example, primary pilot channel receiving component 136 may be configured to receive primary pilot channel 134 from UE 102 on the UL.

In an aspect, data and control channel demodulating component 138 may be configured to demodulate the data and control channel transmitted from the UE. For example, in an aspect, the data and the control channel is demodulated using the primary pilot channel 134 as phase reference. In an additional aspect, the data and the control channel are demodulated based on a fixed offset relative to the primary pilot channel. In an aspect, the primary pilot channel 134 may be a dedicated physical control channel (DPCCH).

In an aspect, the secondary pilot manager 122 and primary channel manager 132 are configured to respectively manage the secondary and primary pilot channels for improving the demodulation reliability of an UL HS-DPCCH at a base station. Therefore, according to the present apparatus and methods, demodulation reliability manager 112 improves demodulation reliability of an UL HS-DPCCH at a base station by receiving a secondary pilot channel from a user equipment (UE) on an uplink (UL) and demodulating the HS-DPCCH using at least the secondary pilot channel.

Figure 2:
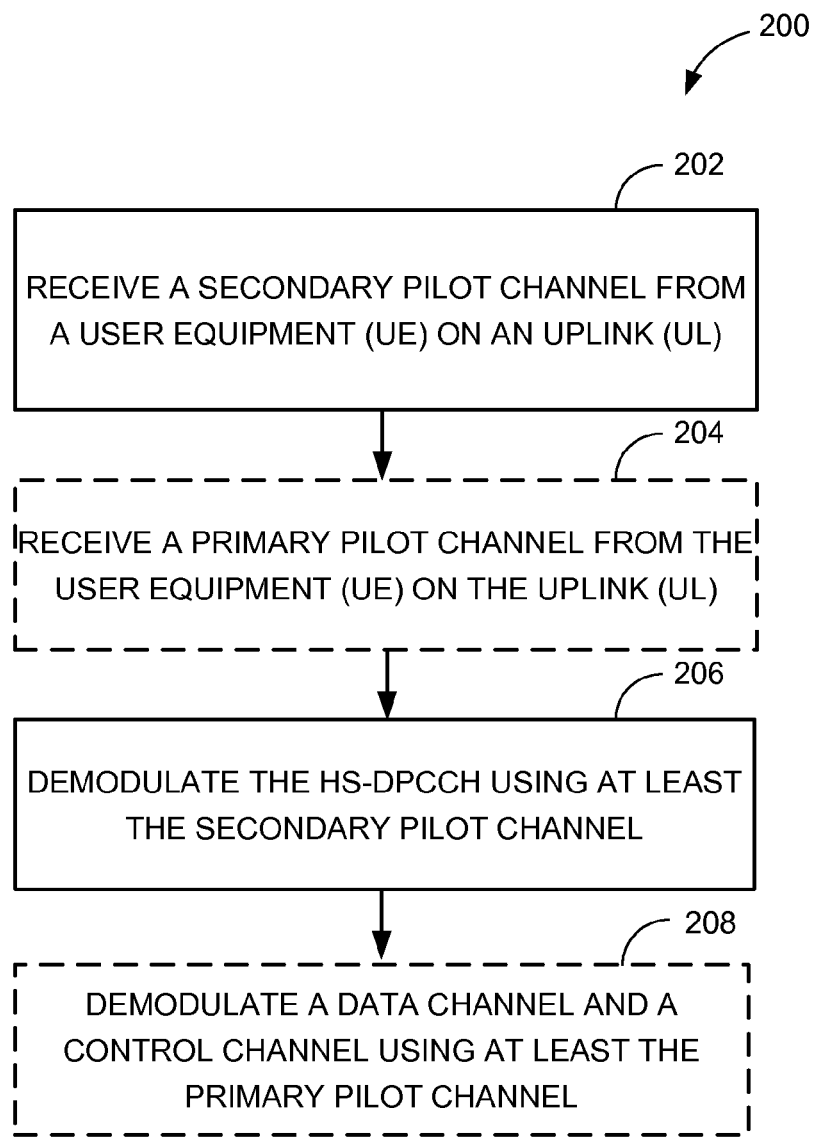
FIG. 2 is a flowchart of an aspect of demodulation reliability manager in a wireless network.

FIG. 2 illustrates an example methodology 200 for improving demodulation reliability of an uplink (UL) high speed dedicated physical control channel (HS-DPCCH) at a base station. In an aspect, at block 202, methodology 200 may include receiving a secondary pilot channel from a user equipment (UE) on an uplink (UL). For example, serving base station 104 and/or secondary pilot channel manager 122 and/or secondary pilot channel receiving component 126 may receive a secondary pilot channel 124 from UE 102.

At optional block 204, methodology 200 may include receiving a primary pilot channel from the user equipment (UE) on the uplink (UL). For example, serving base station 104 and/or primary pilot channel manager 132 and/or primary pilot channel receiving component 136 may receive a primary pilot channel 134 from UE 102. In an optional aspect, a primary pilot channel 134 may be transmitted from the UE and received by primary pilot channel receiving component 136. In an additional or optional aspect, the secondary pilot channel and the primary pilot channel may be simultaneously received at the serving base station or may be received one after the other.

Further, at block 206, methodology 200 may include demodulating the HS-DPCCH using at least the secondary pilot channel. In an aspect, at block 206, methodology 200 may include demodulating the HS-DPCCH using at least the secondary pilot channel. For example, serving base station 104 and/or secondary pilot channel manager 124 and/or HS-DPCCH demodulating component 128 may demodulate the HS-DPCCH using the received secondary pilot channel. The demodulation reliability of HS-DPCCH is increased when the HS-DPCCH is demodulated using the secondary pilot channel as a reference as the secondary pilot channel may be primarily power controlled by the serving cell of the UE.

Further, at block 208, methodology 200 may include demodulating a data and a control channel using at least the primary pilot channel. In an aspect, at block 208, methodology 200 may include demodulating the data and the control channel using at least the primary pilot channel. For example, serving base station 104 and/or primary pilot channel manager 132 and/or data and control channel demodulating component 138 may demodulate the data and the control channel using the received primary pilot channel. In an additional or optional aspect, the secondary pilot channel and the primary pilot channel may be simultaneously demodulated at the serving base station or may be demodulated one after the other.

Figure 3:
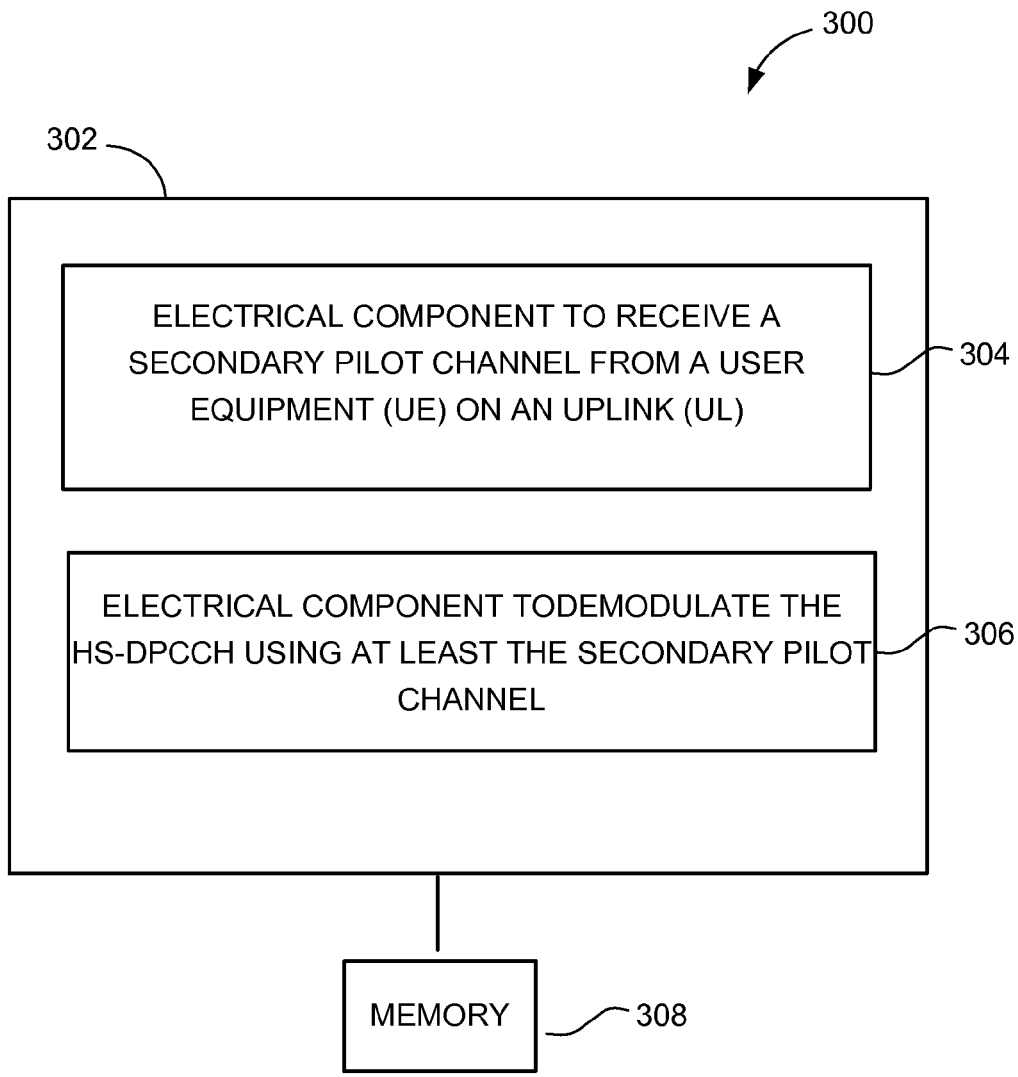
FIG. 3 is a diagram illustrating an example of a network architecture.

Referring to FIG. 3, an example system 300 is displayed for improving demodulation reliability of an uplink (UL) high speed dedicated physical control channel (HS-DPCCH) at a base station. For example, system 300 can reside at least partially within a base station, for example, base station 104 (FIG. 1). It is to be appreciated that system 300 is represented as including functional blocks, which can be functional blocks that represent functions implemented by a processor, software, or combination thereof (for example, firmware). System 300 includes a logical grouping 302 of electrical components that can act in conjunction. For instance, logical grouping 302 may include an electrical component 304 receiving a secondary pilot channel from a user equipment (UE) on an uplink (UL). In an aspect, electrical component 304 may comprise secondary pilot channel manager 122 and/or secondary pilot channel receiving component 126 (FIG. 1).

Additionally, logical grouping 302 may include an electrical component 306 for demodulating the HS-DPCCH using at least the secondary pilot channel. In an aspect, electrical component 306 may comprise secondary pilot channel manager 122 and/or HS-DPCCH demodulating component 128 (FIG. 1).

Additionally, system 300 can include a memory 308 that retains instructions for executing functions associated with the electrical components 304 and 306, stores data used or obtained by the electrical components 304 and 306 etc. While shown as being external to memory 308 it is to be understood that one or more of the electrical components 304 and 306 can exist within memory 308. In one example, electrical components 304 and 306 can comprise at least one processor, or each electrical component 304 and 306 can be a corresponding module of at least one processor. Moreover, in an additional or alternative example, electrical components 304 and 306 can be a computer program product including a computer readable medium, where each electrical component 304 and 306 can be corresponding code.

Figure 4:
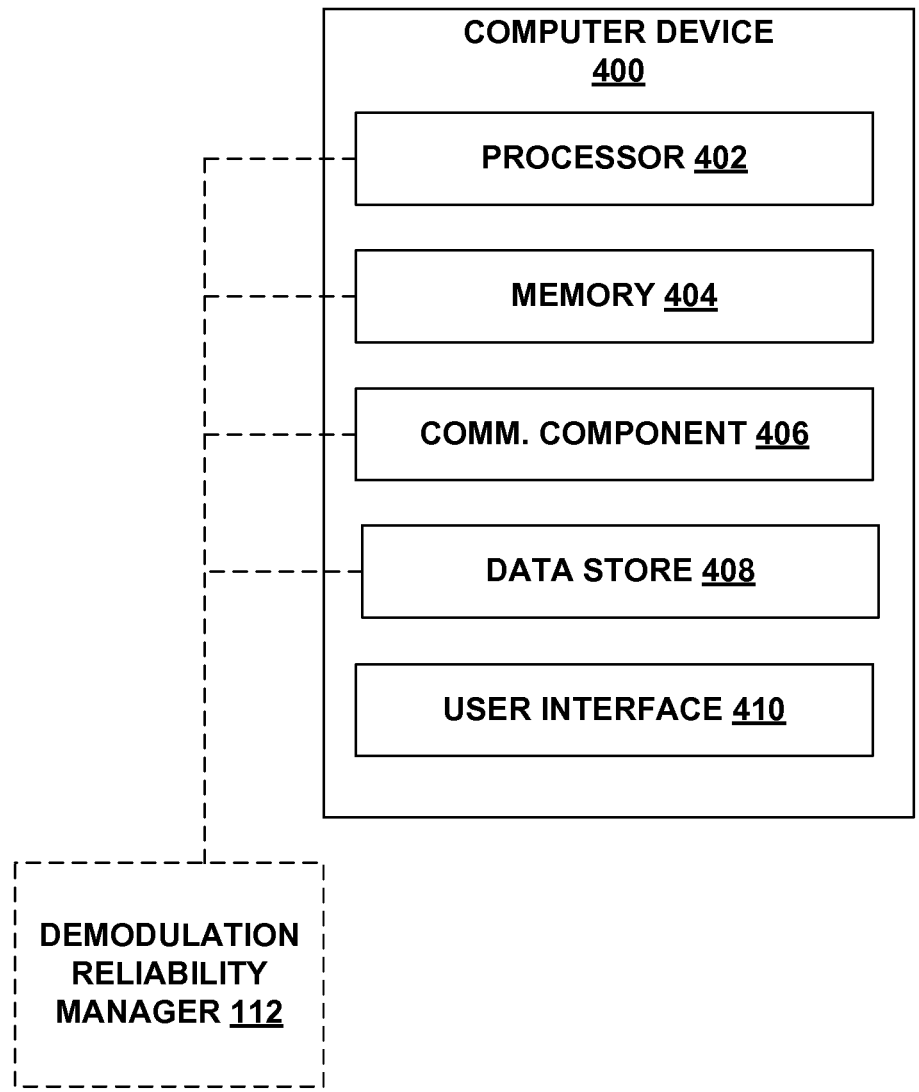
FIG. 4 is a block diagram illustrating aspects of a logical grouping of electrical components as contemplated by the present disclosure.

Referring to FIG. 4, in one aspect, base station 104, including demodulation reliability manager 112 (FIG. 1) may be represented by a specially programmed or configured computer device 400. In one aspect of implementation, computer device 400 may include demodulation reliability manager 112 and/or secondary pilot channel manager 122 and/or primary pilot channel manager 132 (FIG. 1), such as in specially programmed computer readable instructions or code, firmware, hardware, or some combination thereof. Computer device 400 includes a processor 402 for carrying out processing functions associated with one or more of components and functions described herein. Processor 402 can include a single or multiple set of processors or multi-core processors. Moreover, processor 402 can be implemented as an integrated processing system and/or a distributed processing system.

Computer device 400 further includes a memory 404, such as for storing data used herein and/or local versions of applications being executed by processor 402. Memory 404 can include any type of memory usable by a computer, such as random access memory (RAM), read only memory (ROM), tapes, magnetic discs, optical discs, volatile memory, non-volatile memory, and any combination thereof.

Further, computer device 400 includes a communications component 406 that provides for establishing and maintaining communications with one or more parties utilizing hardware, software, and services as described herein. Communications component 406 may carry communications between components on computer device 400, as well as between computer device 400 and external devices, such as devices located across a communications network and/or devices serially or locally connected to computer device 400. For example, communications component 406 may include one or more buses, and may further include transmit chain components and receive chain components associated with a transmitter and receiver, respectively, or a transceiver, operable for interfacing with external devices. In an additional aspect, communications component 406 may be configured to receive one or more pages from one or more subscriber networks. In a further aspect, such a page may correspond to the second subscription and may be received via the first technology type communication services.

Additionally, computer device 400 may further include a data store 408, which can be any suitable combination of hardware and/or software, that provides for mass storage of information, databases, and programs employed in connection with aspects described herein. For example, data store 408 may be a data repository for applications not currently being executed by processor 402 and/or any threshold values or finger position values.

Computer device 400 may additionally include a user interface component 410 operable to receive inputs from a user of computer device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Figure 5:
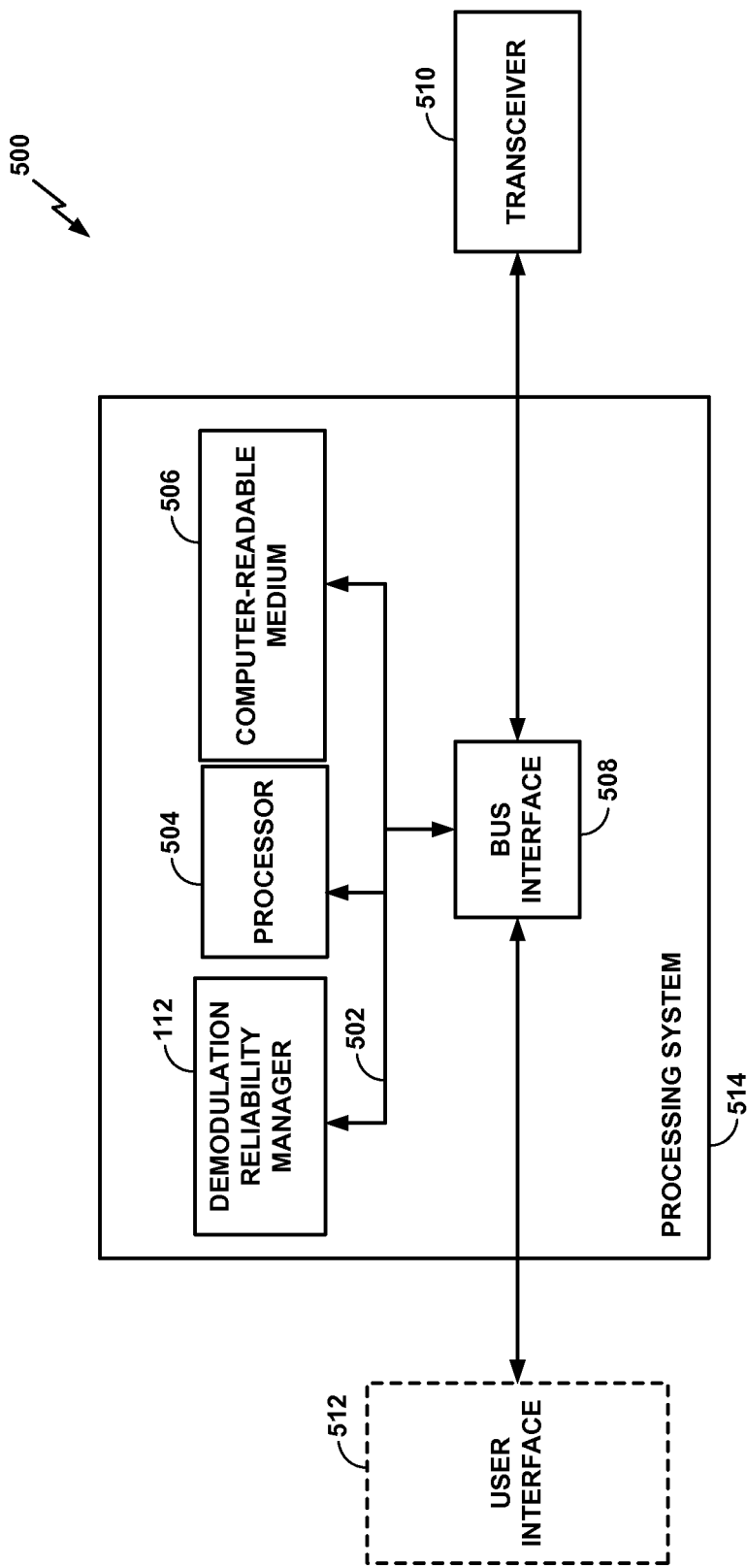
FIG. 5 is a block diagram illustrating an example of a hardware implementation for an apparatus employing a processing system.

FIG. 5 is a block diagram illustrating an example of a hardware implementation for an apparatus 500, for example, including demodulation reliability manager 112 of FIG. 1, employing a processing system 514 for carrying out aspects of the present disclosure, such as method for joint power and resource management. In this example, the processing system 514 may be implemented with a bus architecture, represented generally by a bus 502. The bus 502 may include any number of interconnecting buses and bridges depending on the specific application of the processing system 514 and the overall design constraints. The bus 502 links together various circuits including one or more processors, represented generally by the processor 504, computer-readable media, represented generally by the computer-readable medium 505, and one or more components described herein, such as, but not limited to, demodulation reliability manager 112 and/or secondary pilot channel manager 122 and/or primary pilot channel manager 132 (FIG. 1). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 505. The software, when executed by the processor 504, causes the processing system 514 to perform the various functions described infra for any particular apparatus. The computer-readable medium 505 may also be used for storing data that is manipulated by the processor 504 when executing software.

Figure 6:
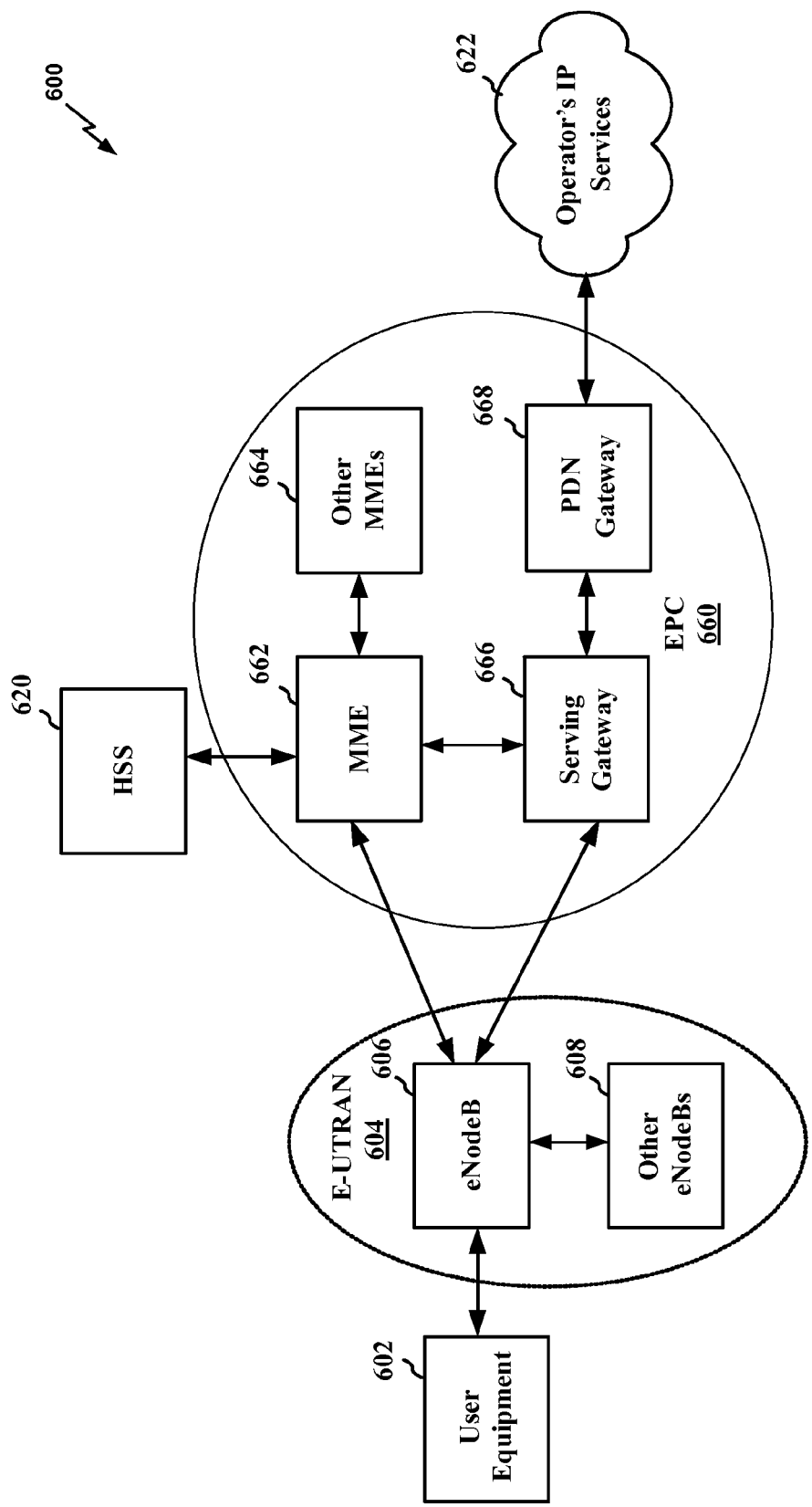
FIG. 6 is a block diagram conceptually illustrating an example of a telecommunications system.

FIG. 6 is a diagram illustrating a long term evolution (LTE) network architecture 600 employing various apparatuses of wireless communication system 100 (FIG. 1) and may include one or more base stations configured to include a demodulation reliability manager 112 (FIG. 1). The LTE network architecture 600 may be referred to as an Evolved Packet System (EPS) 600. EPS 600 may include one or more user equipment (UE) 602, an Evolved UMTS Terrestrial Radio Access Network (E-UTRAN) 604, an Evolved Packet Core (EPC) 660, a Home Subscriber Server (HSS) 620, and an Operator's IP Services 622. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 606 and other eNBs 608. The eNB 606 provides user and control plane protocol terminations toward the UE 602. The eNB 606 may be connected to the other eNBs 608 via an X2 interface (i.e., backhaul). The eNB 606 may also be referred to by those skilled in the art as a base station, a base transceiver station, a radio base station, a radio transceiver, a transceiver function, a basic service set (BSS), an extended service set (ESS), or some other suitable terminology. The eNB 606 provides an access point to the EPC 660 for a UE 602. Examples of UEs 602 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 602 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 606 is connected by an S1 interface to the EPC 660. The EPC 660 includes a Mobility Management Entity (MME) 662, other MMEs 664, a Serving Gateway 666, and a Packet Data Network (PDN) Gateway 668. The MME 662 is the control node that processes the signaling between the UE 602 and the EPC 610. Generally, the MME 612 provides bearer and connection management. All user IP packets are transferred through the Serving Gateway 666, which itself is connected to the PDN Gateway 668. The PDN Gateway 668 provides UE IP address allocation as well as other functions. The PDN Gateway 668 is connected to the Operator's IP Services 622. The Operator's IP Services 622 include the Internet, the Intranet, an IP Multimedia Subsystem (IMS), and a PS Streaming Service (PSS).

Figure 7:
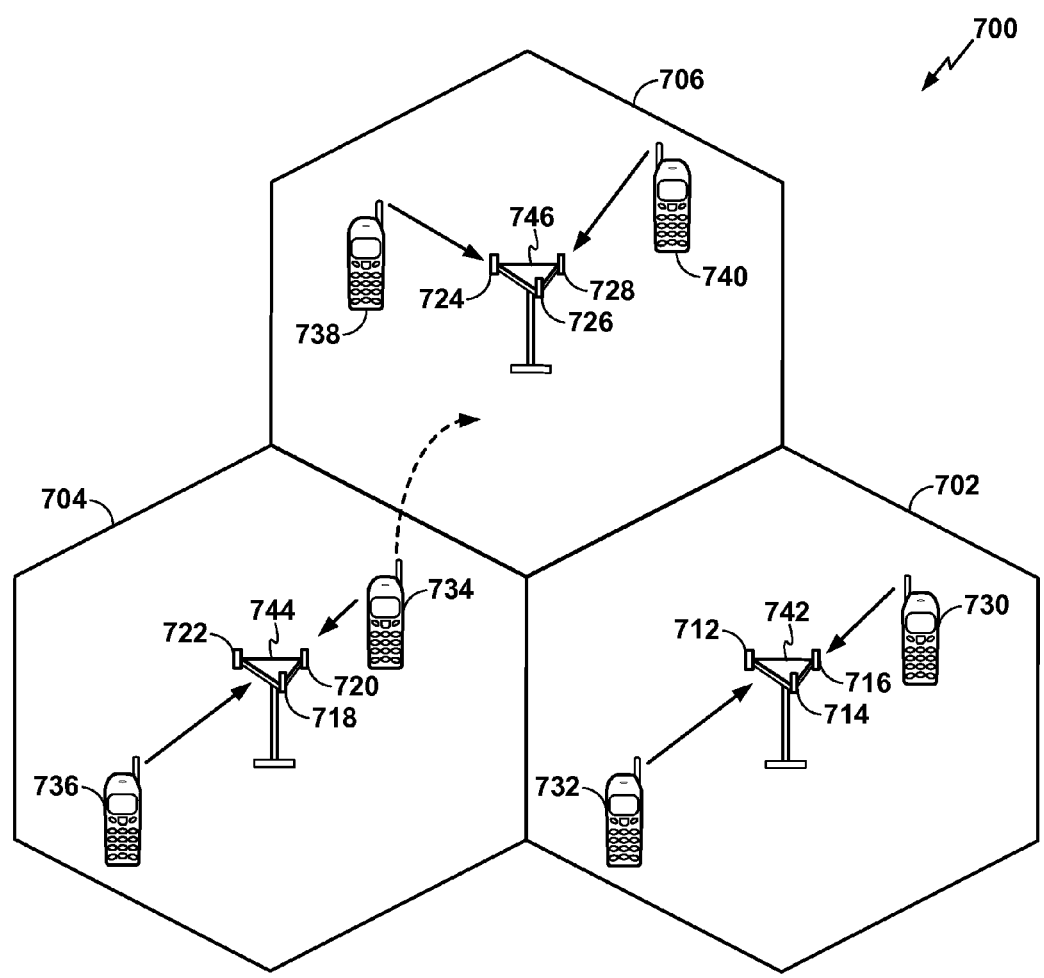
FIG. 7 is a conceptual diagram illustrating an example of an access network.

Referring to FIG. 7, an access network 700 in a UTRAN architecture is illustrated, and may include one or more base stations configured to include a demodulation reliability manager 112 (FIG. 1). The multiple access wireless communication system includes multiple cellular regions (cells), including cells 702, 704, and 706, each of which may include one or more sectors and which may be base station 104 of FIG. 1. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 717, 720, and 722 each correspond to a different sector. In cell 706, antenna groups 724, 726, and 728 each correspond to a different sector. The cells 702, 704 and 706 may include several wireless communication devices, e.g., User Equipment or UEs, for example, including UE 102 of FIG. 1, which may be in communication with one or more sectors of each cell 702, 704 or 706. For example, UEs 730 and 732 may be in communication with NodeB 742, UEs 734 and 736 may be in communication with NodeB 744, and UEs 737 and 740 can be in communication with NodeB 746. Here, each NodeB 742, 744, 746 is configured to provide an access point for all the UEs 730, 732, 734, 736, 738, 740 in the respective cells 702, 704, and 706. Additionally, each NodeB 742, 744, 746 and UEs 730, 732, 734, 736, 738, 740 may be UE 102 of FIG. 1 and may perform the methods outlined herein.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 806 (FIG. 8), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel DPCH or fractional downlink dedicated physical channel F-DPCH to the UE 734 may constitute the Active Set). In any case, UE 734 may execute reselection manager 104 to perform the reselection operations described herein.

Further, the modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 902.11 (Wi-Fi), IEEE 902.16 (WiMAX), IEEE 902.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
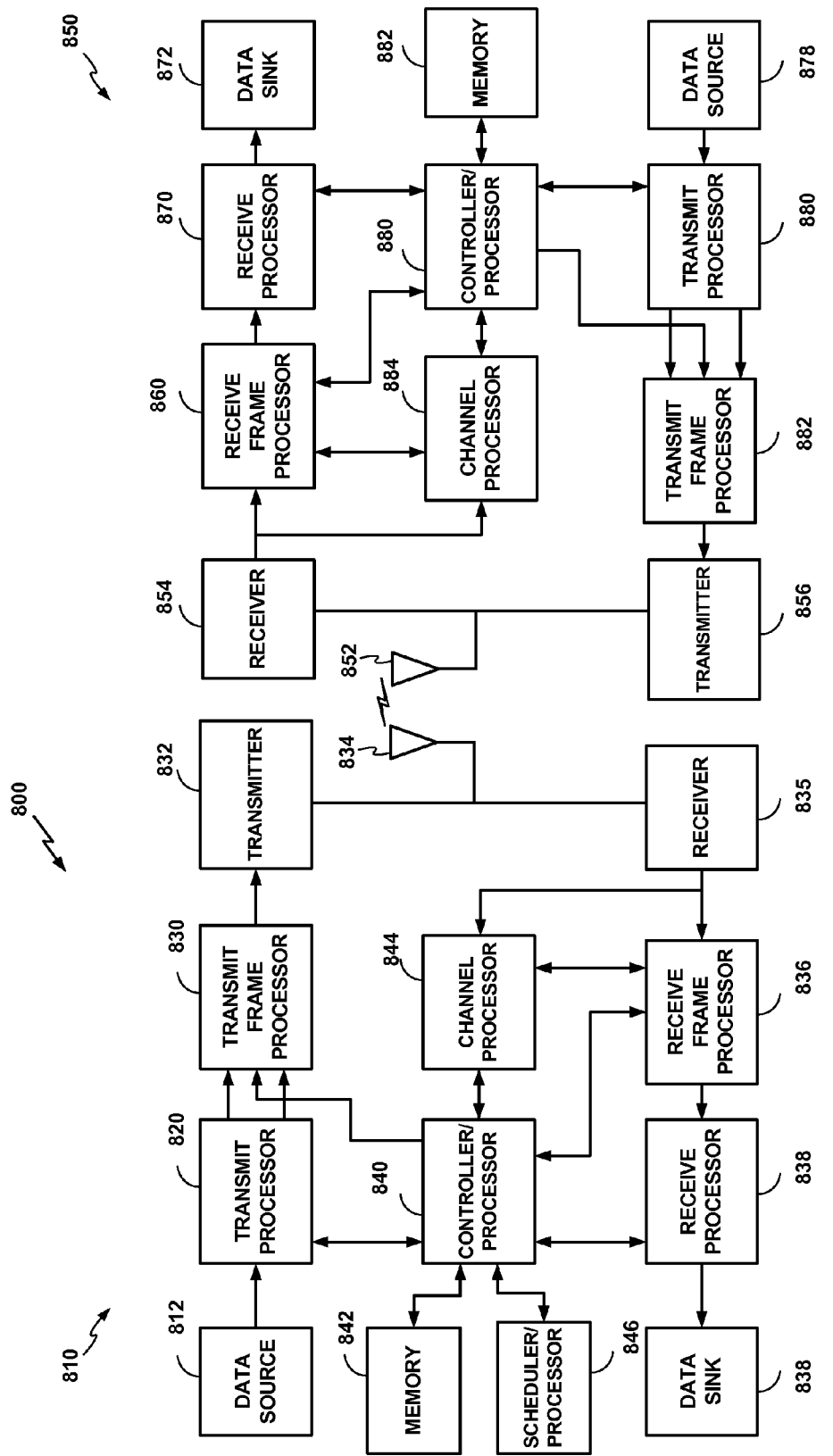
FIG. 8 is a block diagram conceptually illustrating an example of a NodeB in communication with a UE in a telecommunications system.

FIG. 8 is a block diagram of a NodeB 810 in communication with a UE 850, where the NodeB 810 may one or more of base station 104, and/or may include a demodulation reliability manager 112 (FIG. 1). In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the NodeB 88. More specifically, the receive processor 870 descrambles and despreads the symbols, and then determines the most likely signal constellation points transmitted by the NodeB 88 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the NodeB 88, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the NodeB 88 or from feedback contained in the midamble transmitted by the NodeB 88, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the NodeB 88 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the NodeB 810 and the UE 850, respectively. For example, the controller/processors 840 and 890 may provide various functions including timing, peripheral interfaces, voltage regulation, power management, and other control functions. The computer readable media of memories 842 and 892 may store data and software for the NodeB 810 and the UE 850, respectively. A scheduler/processor 846 at the NodeB 810 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for improving demodulation reliability of a primary high speed dedicated physical control channel (HS-DPCCH), received from a user equipment on a uplink (UL), at a base station, comprising:
    receiving a secondary HS-DPCCH, from the UE on the UL, at the base station; and
    demodulating the primary HS-DPCCH using at least the secondary HS-DPCCH as a phase reference and based at least on a fixed offset relative to the secondary HS-DPCCH.

2. The method of claim 1, wherein the demodulating comprises:
    demodulation of an acknowledgement message (ACK), or a not acknowledged message (NACK), or a Channel Quality Indicator (CQI) message received on the UL from the UE for scheduling a down link (DL) to the UE.

3. The method of claim 1, further comprising:
    receiving the primary HS-DPCCH from the UE.

4. The method of claim 1, further comprising:
    demodulating a data channel transmitted on the UL from the UE at the base station using the primary HS-DPCCH.

5. The method of claim 4, wherein the demodulating of the data channel on the UL is performed based at least on a fixed offset relative to the primary HS-DPCCH.

6. The method of claim 1, wherein the secondary HS-DPCCH is received by one or more serving cells in a multi-flow mechanism.

7. The method of claim 6, wherein a transmitted power of the secondary HS-DPCCH is controlled by the one or more serving cells in the multi-flow mechanism.

8. An apparatus for improving demodulation reliability of a primary high speed dedicated physical control channel (HS-DPCCH), received from a user equipment on a uplink (UL), at a base station, comprising:
    means for receiving a secondary HS-DPCCH, from the UE on the UL, at the base station; and
    means for demodulating the primary HS-DPCCH using at least the secondary HS-DPCCH as a phase reference and based at least on a fixed offset relative to the secondary HS-DPCCH.

9. The apparatus of claim 8, wherein the means for demodulating is further configured to demodulate an acknowledgement message (ACK), or a not acknowledged message (NACK), or a Channel Quality Indicator (CQI) message received on the UL from the UE for scheduling a down link (DL) to the UE.

10. The apparatus of claim 8, further comprising:
    means for receiving the primary HS-DPCCH from the UE.

11. The apparatus of claim 10, further comprising means for demodulating a data channel transmitted on the UL from the UE using the primary HS-DPCCH.

12. A non-transitory computer readable medium storing computer executable code for improving demodulation reliability of a primary high speed dedicated physical control channel (HS-DPCCH), received from a user equipment on a uplink (UL), at a base station, comprising:
    code for receiving a secondary HS-DPCCH, from the UE on the UL, at the base station; and
    code for demodulating the primary HS-DPCCH using at least the secondary HS-DPCCH as a phase reference and based at least on a fixed offset relative to secondary HS-DPCCH.

13. The computer readable medium of claim 12, wherein the code for demodulating further comprises:
    code for demodulation of an acknowledgement message (ACK), or a not acknowledged message (NACK), or a Channel Quality Indicator (CQI) message received on the UL from the UE for scheduling a down link (DL) to the UE.

14. The computer readable medium of claim 12, further comprising:
    code for receiving the primary HS-DPCCH from the UE.

15. The computer readable medium of claim 14, further comprising code for demodulating a data channel transmitted on the UL from the UE using the primary HS-DPCCH.

16. An apparatus for improving demodulation reliability of a primary high speed dedicated physical control channel (HS-DPCCH), received from a user equipment on a uplink (UL), at a base station, comprising:
    a secondary pilot channel receiving component to receive a secondary HS-DPCCH, from the UE on the UL, at the base station; and
    a HS-DPCCH demodulating component to demodulate the primary HS-DPCCH using at least the secondary HS-DPCCH as a phase reference and based at least on a fixed offset relative to the secondary HS-DPCCH.

17. The apparatus of claim 16, wherein the HS-DPCCH demodulating component is further configured to demodulate an acknowledgement message (ACK), or a not acknowledged message (NACK), or a Channel Quality Indicator (CQI) message received on the UL from the UE for scheduling a down-link (DL) to the UE.

18. The apparatus of claim 16, further comprising:
a primary pilot channel receiving component configured to receive the primary HS-DPCCH from the UE.

19. The apparatus of claim 18, further comprising:
a data and control channel demodulating component configured to demodulate a data channel transmitted on the UL from the UE at the base station using the primary HS-DPCCH.

20. The apparatus of claim 19, wherein the data and control channel demodulating component is further configured to demodulate the data channel based at least on a fixed offset relative to the primary HS-DPCCH.

21. The apparatus of claim 16, wherein the secondary HS-DPCCH is received by one or more serving cells in a multi-flow mechanism.

22. The apparatus of claim 21, wherein a transmitted power of the secondary HS-DPCCH is controlled by the one or more serving cells in the multi-flow mechanism.

* * * * *